Aug. 21, 1962  G. L. GRUNDMEIER  3,050,030
ADJUSTABLE FEEDING TROUGHS FOR FOWL
Filed Jan. 6, 1961  2 Sheets-Sheet 1
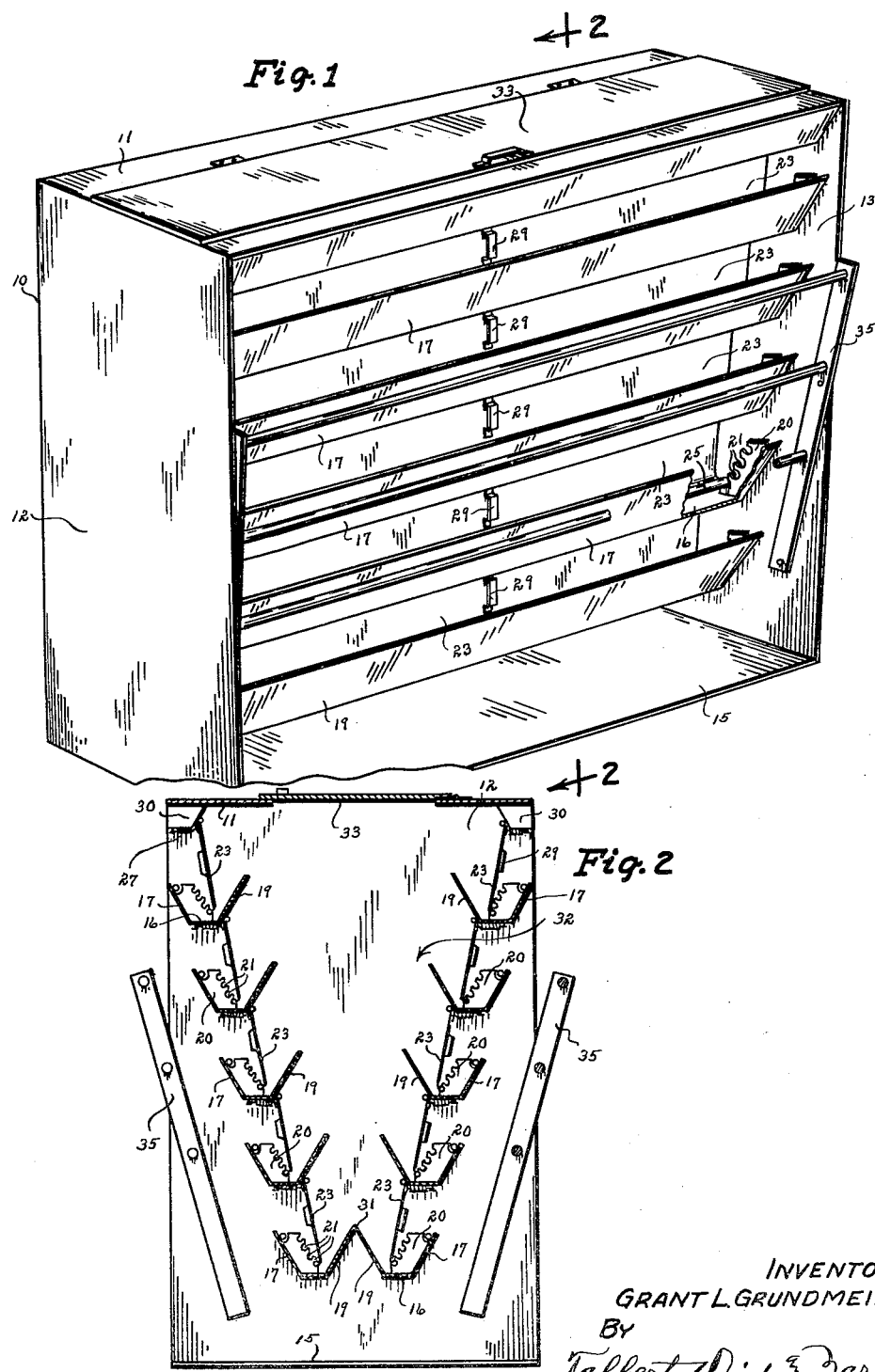
INVENTOR
GRANT L. GRUNDMEIER
BY
Talbert Dick & Jarley
ATTORNEYS
WITNESS
FRED BAUGUS Aug. 21, 1962 G. L. GRUNDMEIER 3,050,030
ADJUSTABLE FEEDING TROUGHS FOR FOWL
Filed Jan. 6, 1961 2 Sheets-Sheet 2
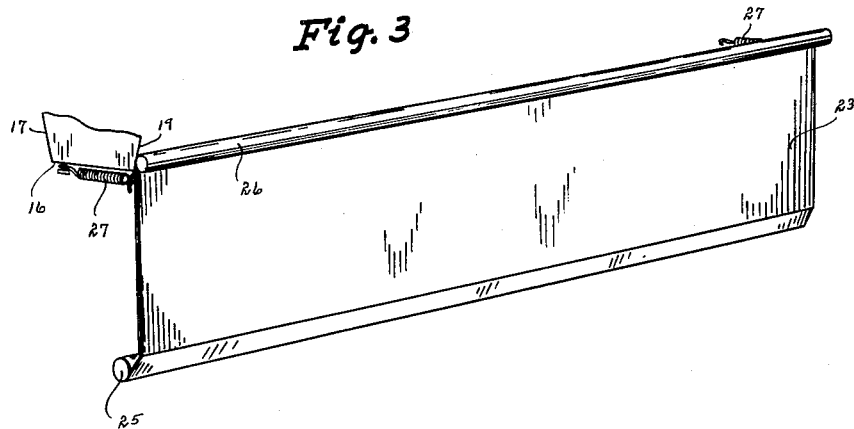
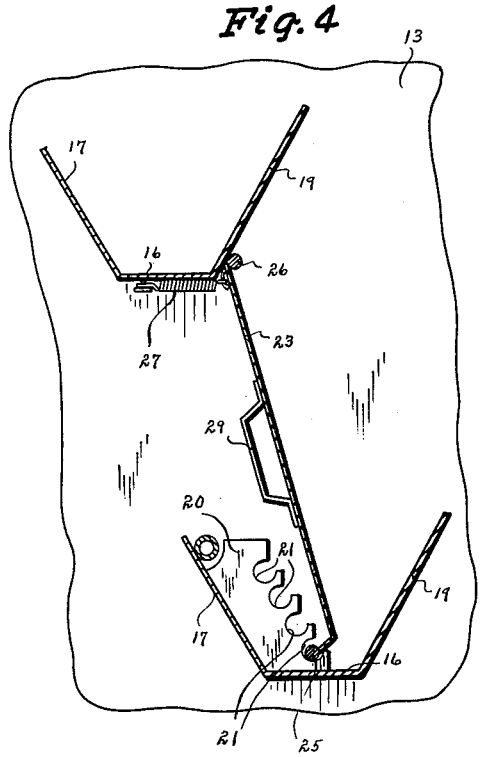
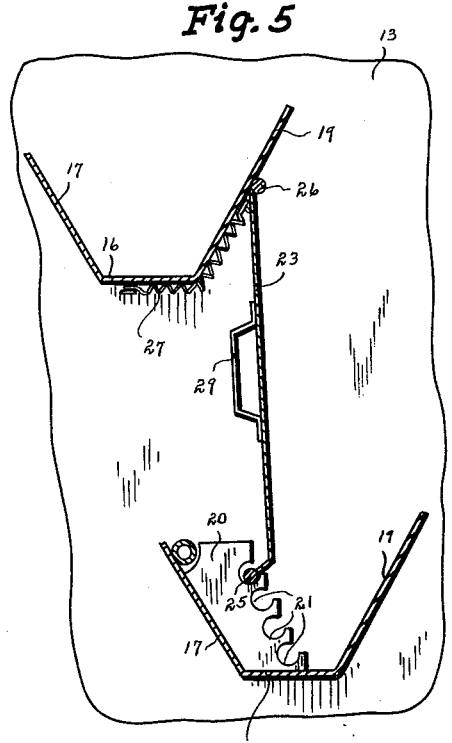
INVENTOR
GRANT L. GRUNDMEIER
BY
Talbert Dick & Jarley
ATTORNEYS
WITNESS
FRED BAUGUS

United States Patent Office 3,050,030
Patented Aug. 21, 1962

3,050,030
ADJUSTABLE FEEDING TROUGHS FOR FOWL
Grant L. Grundmeier, Northwood, Iowa
Filed Jan. 6, 1961, Ser. No. 81,079
4 Claims. (Cl. 119—53)

This invention relates to an automatic feeding means for fowls and more particularly to a multiple trough feeder that has an independent feed regulating device for each of the troughs.

Most feeders for chickens, turkeys, broilers and like consist of merely an elongated trough resting on the ground surface. While such feeding means is preferable to trays, pans, dishes or like, an elongated trough does have many objections. Obviously, to feed a great number of birds, the trough would by necessity have to be of great length, thereby not only requiring an extended area, but making the replenishing of feed manually therein a long and tedious task. Also, such a trough would be exposed to the elements. Furthermore, such an elongated trough would be very expensive to equip with an automatic feed supplying means.

Therefore one of the principal objects of my invention is to provide a feeder for fowls that occupies a relatively small horizontal space thereby making it possible to successfully feed a great number of birds in a confined feeding area.

A further object of this invention is to provide a compact feeder that automatically maintains feed in the trough portions.

A still further object of this invention is to provide a feeder having a plurality of trough sections that permits an independent regulating of the feed into each trough.

A still further object of this invention is to provide an automatic feeder that permits adjustment for different kinds of feed.

A still further object of this invention is to provide a fowl feeding means that is substantially protected from the elements such as wind, rain, snow and like.

A still further object of this invention is to provide a feeder that is easily cleaned.

A still further object of this invention is to provide a feeder that may be successfully used inside a building or out of doors.

A still further object of my invention is to provide a feeding means for fowls that is economical in manufacture, versatile and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a perspective view of my feeder with a section cut away to more fully illustrate its construction;

FIG. 2 is a cross-sectional view of the feeder taken on line 2—2 of FIG. 1;

FIG. 3 is an enlarged perspective view of one of the feed regulating baffle panel boards;

FIG. 4 is an enlarged cross-sectional view showing a feed regulating baffle panel plate in one of its positions of adjustment; and FIG. 5 is another enlarged cross-sectional view showing a feed regulating baffle panel plate in still another position of adjustment.

In these drawings I have used the numeral 10 to generally designate the frame of my feeder having a top 11, two ends 12 and 13, and a bottom 15. This frame housing has both sides open as shown in FIG. 2. Within this frame housing are two spaced apart rows of feeding troughs. The two rows of troughs extend upward and outwardly away from each other and in general provide the two sides of the device. The troughs of each row are vertically spaced apart. Each trough has a bottom 16, an outer side wall 17, and an inner side wall 19. The two walls 17 and 19 extend upwardly and away from each other as shown in FIG. 5. In each trough and secured to its wall 17 are two or more fixed toothed brackets or racks 20. The teeth of each rack are on the inner marginal side edge of the bracket to provide a row of a plurality of spaced apart sockets 21. Each row of sockets extends upwardly and outwardly as shown in FIG. 2. However, each socket 21 has an opening that extends downwardly and outwardly as shown in FIG. 4. As herebefore noted, the troughs of each row are spaced apart. This space between any two troughs of a row is adjustably restricted by a panel plate 23. Each panel plate has its lower marginal area bent outwardly and downwardly to terminate in a horizontal rod bar 25. A somewhat similar rod bar 26 is at the top of the baffle panel plate 23 for strength purposes. The rod bar 25 of each of the baffle plates 23 is adapted to selectively engage the sockets 21 of the racks 20 in the trough from which the baffle plate extends. In the drawings I show four sockets in each rack. Obviously, if the lower socket is chosen to insert the rod bar, the rod bar must be placed in the lower socket of all the bracket racks in that particular trough. This is true of any selected height socket, i.e., all the engaged sockets of a trough must be in a common horizontal plane. The lowest sockets of each trough are above the inside bottom of the trough so that feed may flow under the baffle plate and into the outer open area of the trough. Each baffle plate is of sufficient height that its upper edge engages the outer side of the wall 19 of the trough above it, as shown in FIG. 5. To yieldingly hold the upper part of each baffle plate onto the wall 19, I use a coil spring 27 having one end detachably secured to the baffle plate and its other end detachably operatively hooked to the upper trough as shown in FIG. 3. The numeral 29 designates a handle member on the outer side of each of the baffle plates to facilitate their manual handling. To adjust a baffle plate in a trough, it is merely necessary to move its lower end inwardly and upwardly to clear its holding sockets, and then place its lower rod bar into the new selected sockets. Different kinds of feed and rates of consumption of feed in the different troughs require different baffle plate adjustment. In FIG. 5 I show a large open area below the baffle plate and in FIG. 4, a relatively small area below the baffle plate. The uppermost two troughs have no troughs above them for their baffle plates to engage and therefore a ledge 30 is provided above each of them as shown in FIG. 2. The two lowermost troughs are close together and therefore their two adjacent inner walls meet, thereby providing the dividing ridge 31. The two upwardly and outwardly extending rows of troughs and their baffle plates produce a central compartment 32 for holding the feed supply to be automatically fed into the various troughs. The feed is placed into the area 32 through the door 33 in the top of the frame housing. By vertically spacing the troughs the entire device will occupy a minimum of ground space. By each row of troughs extending upwardly and outwardly, a feeding fowl sitting on the outer wall of an upper trough will not be able to direct droppings into a lower trough. If desired, a ladder roosting perch 35 may be secured to each side of the feeler as shown in FIG. 2. For cleaning purposes the baffle plates may be easily and quickly removed. The side walls 19 of the troughs may vary as to depth and differently from each other to help direct the gravity flow and volume control of feed into the respective troughs, thereby making possible the feed depletion of all troughs at substantially the same time. The perches 35 may be used by the fowls for night roosting. If desired, only one row of troughs may be used, which might well be the case if the device used one side of a building. The feeder may be of rectangular, circular or other suitable design.

Some changes may be made in the construction and arrangement of my Feeding Means for Fowls without departing from the real spirit and purpose of my invention, and it is my intention to cover by my claims, any modified forms of structure or use of mechanical equivalents which may be reasonably included within their scope.

I claim:

1. In a feeder, a frame housing having a top and two ends, two horizontally spaced apart rows of troughs; the troughs of each row being vertically spaced apart, bracket members in each of said troughs each having a substantially vertical row of sockets a baffle plate extending upwardly from each of said troughs having its lower edge selectively engaging the sockets of the bracket members in the trough from which it extends, whereby said lower edge is vertically spaced a selective distance from the bottom of one of said troughs and the top edge engages the next vertically spaced trough, said two rows of troughs and baffle plates providing a feed holding compartment, and a spring means yieldingly holding the upper end of at least some of said baffle plated adjacent the inner side wall of the trough above it.

2. In a feeder, a frame housing having a top and two ends, two horizontally spaced apart rows of troughs; the troughs of each row being vertically spaced apart, bracket members in each of said troughs each having a substantially vertical row of sockets, a baffle plate extending upwardly from each of said troughs having its lower edge selectively engaging the sockets of the bracket members in the trough from which it extends, whereby said lower edge is vertically spaced a selective distance from the bottom of one of said troughs and the top edge engages the next vertically spaced trough, said two rows of troughs and baffle plates providing a feed holding compartment, and a detachable spring means yieldingly holding the upper end of at least some of said baffle plates adjacent the inner side wall of the trough above it.

3. In a feeder, a frame housing having a top and two ends, two horizontally spaced apart rows of troughs; the troughs of each row being vertically spaced apart, bracket members in each of said troughs each having a substantially vertical row of sockets, a baffle plate extending upwardly from each of said troughs having its lower edge selectively engaging the sockets of the bracket members in the trough from which it extends, whereby said lower edge is vertically spaced a selective distance from the bottom of one of said troughs and the top edge engages the next vertically spaced trough, said two rows of troughs and baffle plates providing a feed holding compartment, a handle member on each of said baffle plates, and a detachable spring means yieldingly holding the upper end of at least some of said baffle plates adjacent the inner side wall of the trough above it.

4. In a feeder, a frame housing having a top and two ends, two horizontally spaced apart rows of troughs; the troughs of each row being vertically spaced apart, bracket members in each of said troughs each having a substantially vertical row of sockets, a baffle plate extending upwardly from each of said troughs having its lower edge selectively engaging the sockets of the bracket members in the trough from which it extends, whereby said lower edge is vertically spaced a selective distance from the bottom of one of said troughs and the top edge engages the next vertically spaced trough, said two rows of troughs and baffle plates providing a feed holding compartment, and a spring means yieldingly holding the upper end of at least some of said baffle plates adjacent the inner side wall of the trough above it; each of said troughs having its side walls extending upwardly and outwardly away from each other.

References Cited in the file of this patent

UNITED STATES PATENTS

| | | |
|---|---|---|
| 1,340,869 | Ashley | May 25, 1920 |
| 1,469,677 | Naylor | Oct. 2, 1923 |
| 1,919,587 | Einsel et al. | July 25, 1933 |
| 1,996,690 | Schlegel | Apr. 2, 1935 |
| 2,578,369 | Noelecke | Dec. 11, 1951 |
| 2,634,705 | Mayes | Apr. 14, 1953 |